Aug. 29, 1939.        S. GELDHOF              2,171,029
                      PNEUMATIC TOOL
              Filed Feb. 2, 1937        5 Sheets-Sheet 1

Inventor
*Silver Geldhof*

*J. S. Murray*
Attorney

Aug. 29, 1939.    S. GELDHOF    2,171,029
PNEUMATIC TOOL
Filed Feb. 2, 1937    5 Sheets-Sheet 2
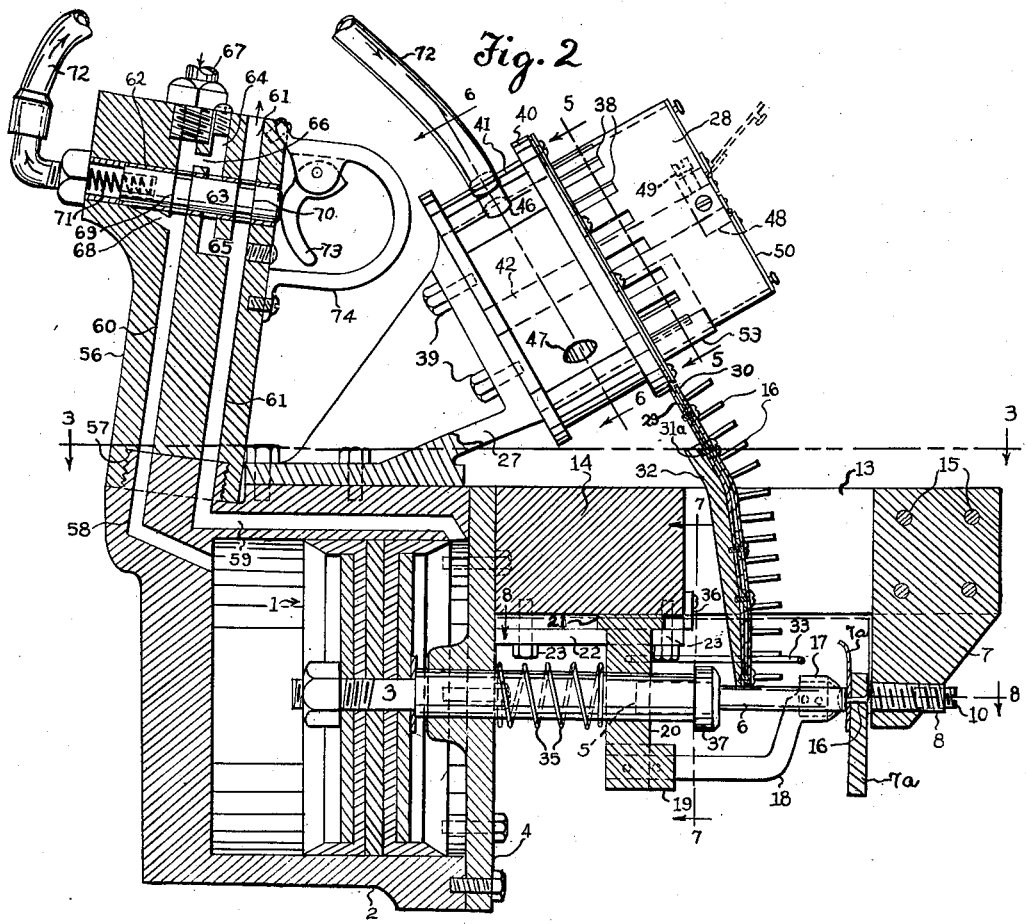
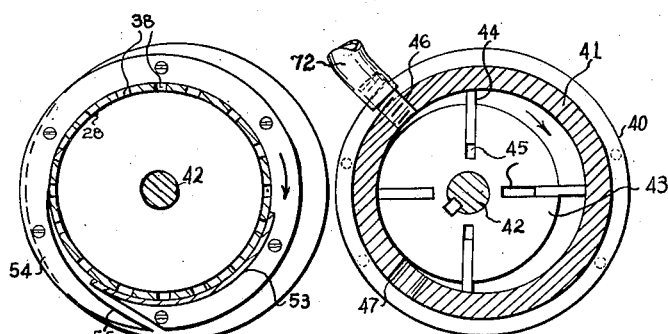
Inventor
Silver Geldhof
J S Murray
Attorney Aug. 29, 1939.  S. GELDHOF  2,171,029
PNEUMATIC TOOL
Filed Feb. 2, 1937  5 Sheets-Sheet 3
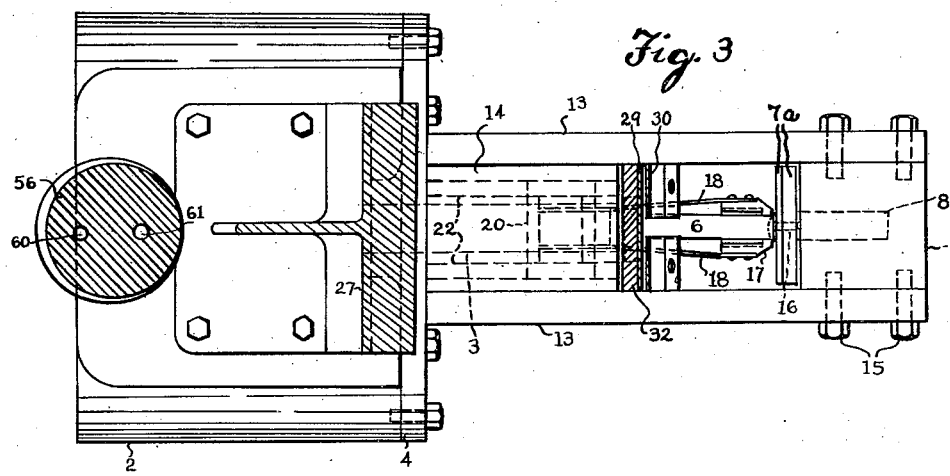
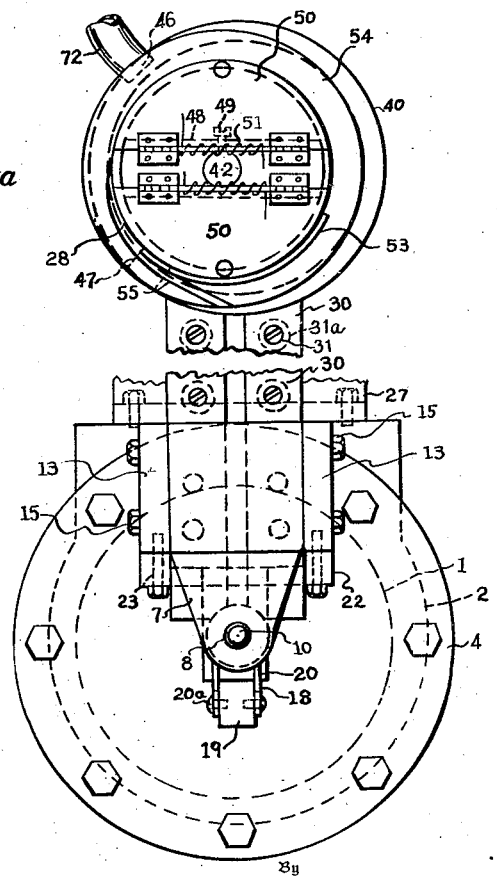
Inventor
Silver Geldhof
JS Murray
Attorney Aug. 29, 1939.  S. GELDHOF  2,171,029
PNEUMATIC TOOL
Filed Feb. 2, 1937  5 Sheets-Sheet 4

Inventor
Silver Geldhof
By
J S Murray
Attorney

Aug. 29, 1939.     S. GELDHOF     2,171,029
PNEUMATIC TOOL
Filed Feb. 2, 1937     5 Sheets-Sheet 5

Inventor
Silver Geldhof
Attorney

Patented Aug. 29, 1939

2,171,029

UNITED STATES PATENT OFFICE 2,171,029

PNEUMATIC TOOL

Silver Geldhof, Detroit, Mich.

Application February 2, 1937, Serial No. 123,648

18 Claims. (Cl. 218—19)

This invention relates to pneumatic tools, and particularly portable pneumatic tools.

An object of the invention is to adapt a pneumatic tool for the selective performance of several different operations, as riveting, punching, and the driving of nails or the like into hard materials.

Another object is to equip a pneumatic tool with a hopper, receiving rivets or other fasteners or work pieces requiring insertion in work under a considerable pressure, and to provide a manually controlled mechanism for feeding such fasteners successively to the work.

A further object is to adapt the described tool to be controlled in its various movements, by a single valve of simple form, and to adapt such valve for trigger actuation.

A further object is to provide a pneumatic tool employing a piston and cylinder to apply pressure required for a riveting or other fastener-inserting operation, and to utilize the pressure of air exhausting from such cylinder to agitate a hopper and thereby effect an individual discharge therefrom of rivets or other fasteners on which the tool operates.

Further objects are to provide a guideway, down which the rivets or other fasteners or work pieces may advance in a linear series, and to associate with such guideway an automatic controller acting to release the lowermost work piece in proper timed relation to a pressure applicator.

These and various other objects are attained by the construction hereinafter described and illustrated in the accompanying drawings, wherein:

Fig. 2 is an axial sectional elevation of the tool, showing the parts, as disposed upon completion of an operation.

Fig. 3 is a horizontal section, taken on the line 3—3 of Fig. 2.

Fig. 4 is a front end view of the machine, omitting the handle and hopper.

Fig. 4a is an end view of the hopper.

Fig. 5 is a cross-sectional view of the hopper, taken upon the line 5—5 of Fig. 2.

Fig. 6 is a cross-section, taken on the line 6—6 of Fig. 2, showing the motor which rotatively actuates the hopper.

Figure 1:
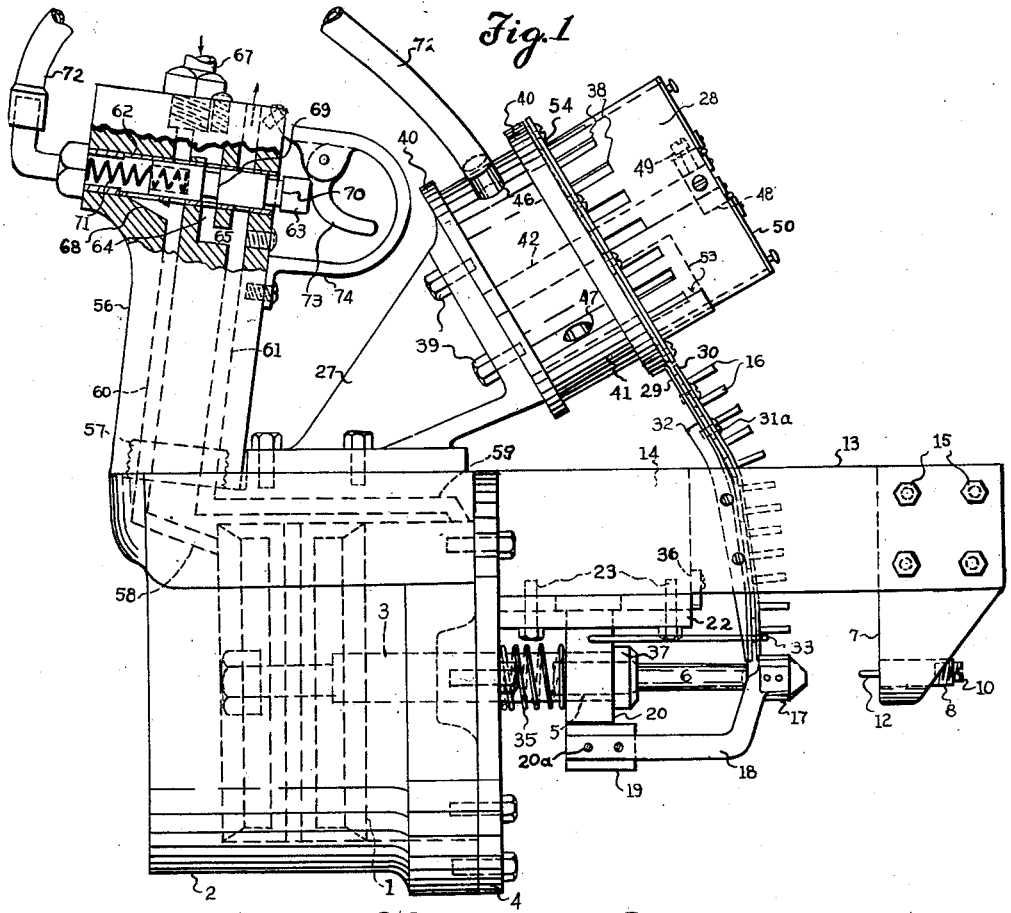
Fig. 1 is a side elevational view of the improved tool, showing its mechanism in the normal position, prevailing at commencement of an operation, the tool handle being broken away to show a valve housed therein.
Figure 7:
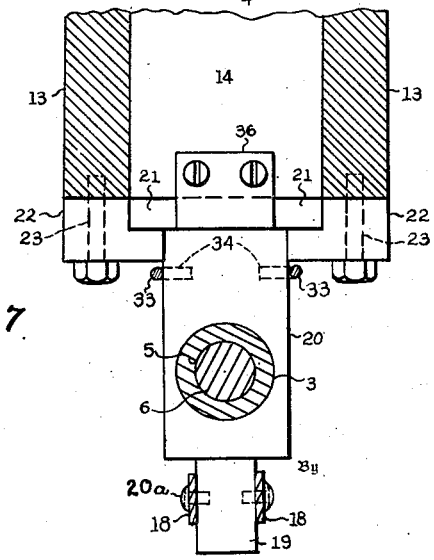
Fig. 7 is a vertical section, taken upon the line 7—7 of Fig. 2, particularly showing the pressure-applying plunger of the tool, and parts associated with the plunger to control the feed of fasteners thereto and hold a fastener during pressure application.
Figure 8:
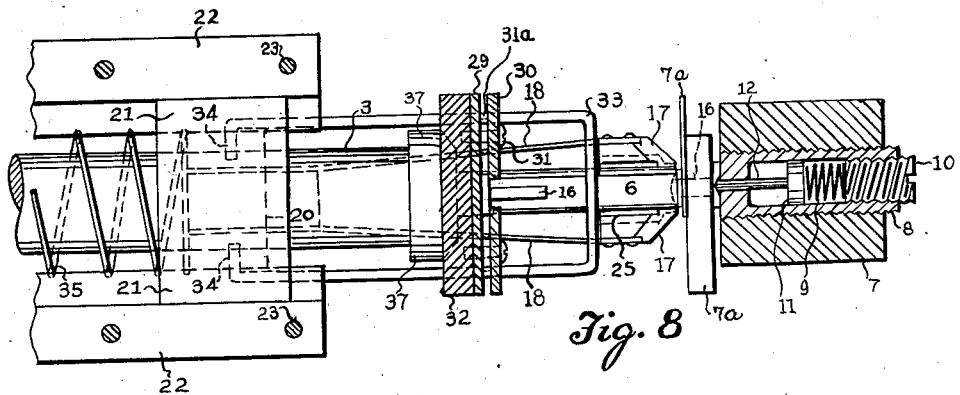
Fig. 8 is a fragmentary horizontal section, taken upon the line 8—8 of Fig. 2, and particularly showing the fastener feed control, and the relation of the riveting dolly and the anvil.

In these views, the reference character 1 designates a double-acting piston, working in a cylinder 2. Driven by said piston is a rod 3, having a slide bearing in a head 4 of the cylinder, the piston being secured to one end of such rod and the other end of the latter being formed with a socket 5. Fitted in such socket and projecting ahead of the rod 3, is a pressure applicator suited to the purposes of any particular job. In Figs. 1 to 8, inclusive, this applicator is a riveting dolly 6. For taking the thrust thereof, there is provided an avil member 7, spaced endwise from the dolly to accommodate the work 7a, and adapted to properly cooperate with the dolly. Thus, the anvil member is bored and tapped to receive a threaded bushing 8, wherein a spring 9 is compressed between an abutment 10 and a small plunger 11 carrying a pin 12, normally projected from the anvil by said spring toward and in alignment with the dolly 6. The axis established by the rod 3, applicator 6, and bushing 8 may be termed the working axis of the tool. The anvil member depends from and is fixed upon the free end of a yoke 13, spaced above the rod 3, and rigidly projecting from the cylinder head 4. As illustrated, this yoke comprises a pair of laterally spaced metal bars, welded or otherwise fixedly secured to opposite sides of a block 14 exteriorly mounted on the upper portion of the head 4. The anvil member is fitted between the free ends of said bars and fastened thereto by bolts 15.

Figure 9:
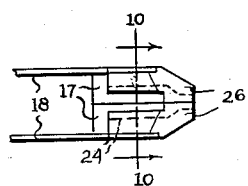
Fig. 9 is a top plan view of the fastener-engaging jaws, in their normal relation.
Figure 10:
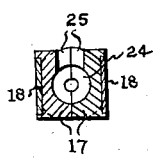
Fig. 10 is a cross sectional view of the jaws taken on the line 10—10 of Fig. 9.

For holding a rivet 16 in place between the dolly 6 and anvil member, while the former is being driven forward to riveting position, a pair of fastener-receiving jaws 17 are mounted at opposite sides of the working axis of the tool, and are riveted (or otherwise rigidly secured) to the forward ends of a pair of spring arms 18. The latter engage, at their rear ends, at opposite sides of a lug 19, downwardly projecting from a carrier block 20 slidably fitted on the rod 3, and are rigidly secured to said lug by screws 20a. The yoke 13 coacts with said rod to guide the carrier 20 in a straight-line travel, the upper end of the carrier being laterally formed with a pair of opposed guide lugs 21 which engage above and between a pair of angular guide rails 22, secured by bolts 23 or the like to the lower edges of the yoke bars. The jaws 17 are grooved lengthwise on their inner faces to form a rivet chamber 24, said jaws being adapted to meet beneath said chamber, under urge of the spring arms 18, and jointly forming a slot 25 above such chamber for the admission of rivets or other fasteners. (Figs. 9 and 10.) At their forward ends, the jaws are formed with restrictions 26, between which the shanks of the rivets 16 may extend while the jaws are mutually contiguous, but which entail a separative movement of the jaws when the head of a rivet 16 is forced between the restrictions.

Disposed above the yoke 13 and supported upon a bracket 27 surmounting the cylinder 2, is a hopper 28 from which the rivets 16, or other fasteners, are adapted to drop along a suitable guideway, serving to deliver them singly to the jaws 17. This guideway comprises a sheet metal backing strip 29, a pair of sheet metal retainer strips 30 secured to the front face of the strip 29 and spaced to accommodate therebetween the shanks of the rivets 16, and a plurality of bolts 31 interconnecting the strips 29 and 30 and carrying washers 31a, interposed between the strips 29 and 30 and forming between the latter a space just adequate to slidingly accommodate the heads of the rivets 16 or other fasteners. Said guideway extends downwardly between the yoke bars 13 and is held in a fixed relation to the latter through attachment by certain of the bolts to a plate 32 rigidly carried by and between said bars. The guideway terminates, at its lower or delivery end, just above the dolly 6 or other applicator.

To assure loading of the jaws 17 at the proper time, there is mounted on the carrier 20 a U-shaped wire feed controller 33, the spaced rear ends of which straddle the upper portion of the carrier and are bent at 34 to engage in opposed apertures of said portion. Such controller projects forwardly above the socket portion of the rod 3, its closed end being disposed in front of the guideway, and being actuable to and from the latter by sliding travel of the carrier 20. The latter is urged by a spring 35, to its forward limiting position established by engagement with a stop 36. An annular head 37 formed on the forward end of the rod 3 is adapted to engage the carrier block 20 during the latter part of the retractive stroke of said rod, to compel the jaws 17 to closely follow the dolly 6 to a retracted position, and to also actuate the feed controller 33 to its retracted position, in which it supports all rivets engaged in the guideway and prevents any downward discharge of such rivets (Fig. 1).

The hopper 28 loosely receives a supply of the rivets 16, and is preferably of cylindrical form and rotative about its axis to agitate said rivets and thereby eventually dispose them in proper discharge relation to a circular series of outlet slots 38 formed in an end portion of the hopper.

It is furthermore preferred to dispose the hopper with its axis inclined acutely to the working axis of the tool, so that the rivets or other fasteners may be gravity-urged toward the slotted or outlet end of the hopper. As illustrated, (Fig. 5 6) a motor for driving the hopper is interposed between the latter and the bracket 27, being secured to the latter by screws 39 or the like. Said motor comprises a pair of heads 40, a cylindrical casing 41, clamped between said heads, a shaft 42 journaled in said heads, in an eccentric relation to the casing, a circular rotor 43 mounted centrally and rigidly on said shaft, and substantially tangential to the casing at one interior point thereof, and a plurality of blades 44 slidable to and from the casing in radial slots 45 of the rotor. Two ports 46 and 47, serving respectively for the admission and exhaust of air, are formed in the casing 41, in oppositely spaced relation to its point of tangency with the rotor and substantially equidistantly from said point. The air chambers formed between the outer portions of the blades, within the crescent-shaped space between the rotor and casing, successively register with the inlet port, and the pressure of air delivered thereto acts on the blades at the larger ends of said chambers to drive the rotor in the direction of the arrow in Fig. 6. When travel of the rotor has afforded substantially a maximum expansion to the air in said chambers, the latter are established in communication with the exhaust port 47.

The shaft 42 is inclined to the working axis of the tool at the angle which is desired for the hopper axis, and projects upwardly and forwardly into the hopper to engage centrally in a bar 48 which is rigidly and diametrically carried by the upper or inlet end of the hopper. A set screw 49 or the like rigidly secures said bar to the shaft, whereby the bar serves as a drive connection from the shaft to the hopper. Hinged to the bar 48, at opposite edges thereof, are cover members 50, normally held closed by coil springs 51. Either of said cover members may be raised to permit replenishing the supply of fasteners in the hopper.

Figure 13:
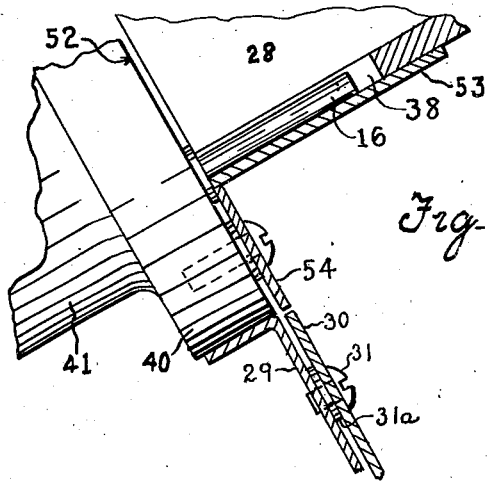
Fig. 13 is a fragmentary radial sectional view of the hopper, showing a rivet in one of the outlet slots thereof.

The slots 38 of the hopper are proportioned in width and length to accommodate the shanks of the rivets 16 or other fasteners, but not the heads thereof. The hopper is so spaced, however, from the adjoining head 40 of the motor as to form a narrow annular slot 52, adequate to accommodate the rivet heads. When agitation of the rivets, due to rotation of the hopper, registers a rivet head with the slot 52 (Fig. 13) and simultaneously or subsequently registers the rivet shank with one of the slots 38, the rivet will assume a discharge position in the slot. A sheet metal guard 53, arcuately extending adjacent to the lower portion of the hopper and fixedly carried by the motor covers the slots 38 as they advance, through rotation of the hopper, to the inlet end of the slideway. An arcuate sheet metal strip 54, fixed upon the motor, is slotted at 55 (Fig. 5) to accommodate the rivet heads as the rivets are delivered from the hopper to the guideway.

A control provision for the tool will now be described. Upstanding from the cylinder, rearwardly of the bracket 27, is a handle 56, preferably adapted for detachment from the tool. As illustrated, said handle is provided in its lower end with a socket to receive a fitting 57, integrally formed upon the cylinder, the socket and fitting having interengaging screw threads. Upwardly opening in the fitting 57 are air passages 58 and 59 which are extended to communicate with opposite ends of the cylinder chamber. Upwardly extending from the socket in the handle are two passages 60 and 61, which register and communicate with the passages 58 and 59, when the handle is attached to the tool. Transversely extending through the upper portion of the handle is a bore in which is rigidly fitted a sleeve 62 wherein a plunger valve 63 is slidable, said sleeve intersecting and being traversed by said passages. Between the passages 60 and 61, a third passage 64 extends downwardly from the top of the handle, traversing the sleeve 62 and communicating at a suitable point below said sleeve, as indicated at 65, with the passage 61. Above the sleeve 62, the passages 64 and 60 communicate as indicated at 66. At the top of the handle, compressed air is adapted to be delivered to the passage 60 through a suitable hose connection 67, and the passage 61 is open to the atmosphere. Below the sleeve 62 a passage 68 branches from the passage 60 and opens through an end portion of the sleeve. The valve 63 is formed with two annular ports 69 and 70 and is urged by a coiled spring 71 to a normal limiting position registering the port 69 with the passage 64 and uncovering the branch passage 68, as indicated in Fig. 1. When occupying the described normal position, the valve affords a flow of exhaust air from the cylinder to a hose connection 72 whereby such air may be delivered to the port 46 of the hopper-driving motor.

To actuate the valve to its other limiting position, a trigger 73 engages the normally projecting end of the valve, and is disposed within and pivoted to a U-shaped guard 74 rigidly mounted on the handle. Actuation of such valve by the trigger serves to register the ports 69 and 70 respectively with the passages 60 and 61, as appears in Fig. 2.

Figure 11:
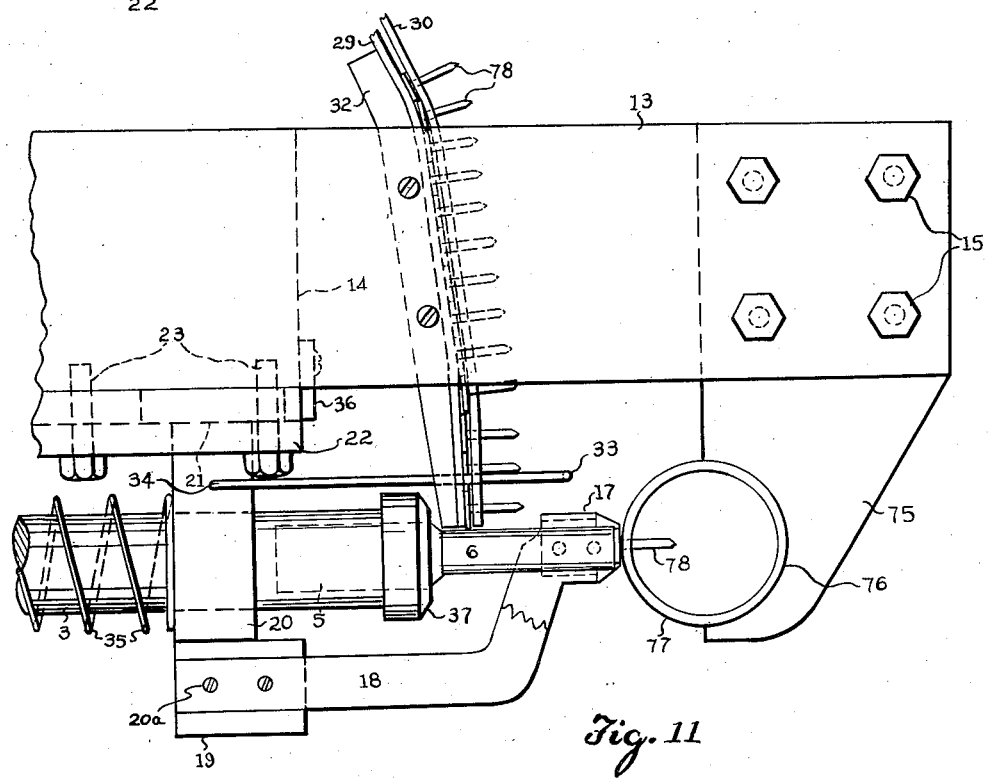
Fig. 11 is a fragmentary side-elevational view, showing the tool as adapted to driving nails into metal tubing.

For using the described tool in driving nails into metal tubing, the construction is modified as shown in Fig. 11. The modification consists merely in substituting an anvil member 75 for that first described, such member having its work-engaging face formed transversely thereof with a semi-cylindrical groove 76, proportioned to snugly accommodate a metal tube 77 wherein nails 78 are to be inserted. The latter are fed down the slideway formed by strips 29, 30, and 31, heretofore described, the entire remaining structure being unchanged. For different sizes of the tubing 77, correspondingly grooved anvil members will be provided, and to accommodate non-tubular work, other shapes of anvil members may be provided to suit such work.

Figure 12:
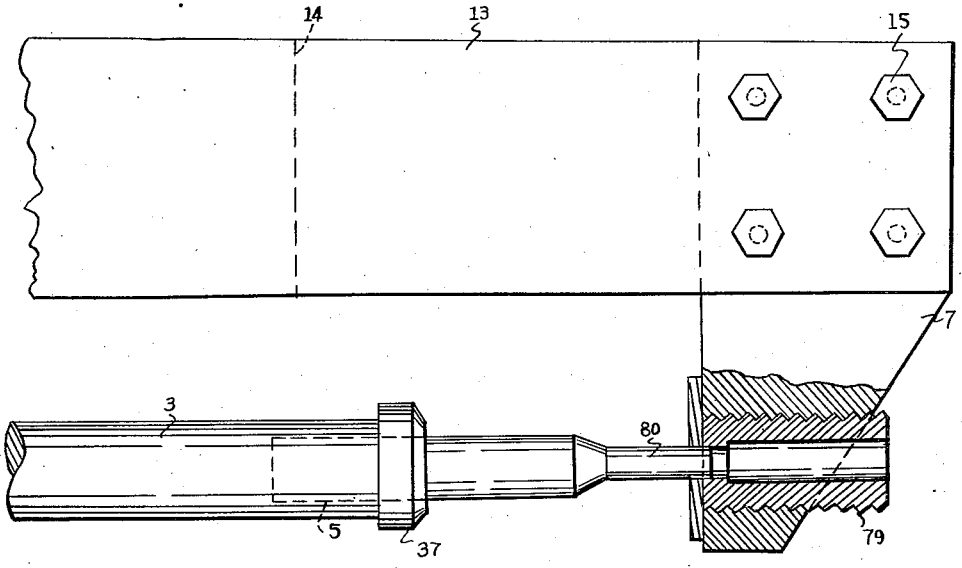
Fig. 12 is a similar view showing the tool as adapted to use as a punch.

To use the tool as a punch, as illustrated by Fig. 12, the anvil member 7 as already described may be retained, the bushing 8, however, being replaced by a bushing 79 constructed to serve as a female die, and the corresponding male die being a punch 80 replacing the dolly 6.

In operation of the described tool, the fastener guideway 29, 30 normally holds a considerable number of the rivets 16 (or other headed fasteners), their heads resting one upon another. The piston 1, rod 3, dolly 6, carrier 20, jaws 17, and feed controller 33 normally occupy their rear limiting positions shown in Fig. 1, one rivet lying within the jaws, which are disposed just in front of the dolly. In the described position, the front end of the feed controller is closely adjacent to the guideway, seating the lowermost rivet in the guideway and hence restraining downward travel of all rivets in the guideway. The plunger valve 63 is in its projected position, affording the exhaust of air from the rear end of the cylinder 2 by way of the passages 58, 60, 68, and hose connection 72, while admitting air to the front end of the cylinder by way of the passages 66 and 64, port 69, and passages 65, 61 and 59.

When it is desired to apply a rivet 16 (or other fastener) to the work, the trigger 73 is pulled, thereby retracting the slide valve 63 to its position shown in Fig. 2. The ports 69 and 70 are now registered with the passages 60 and 61, and air from the supply hose 67 flows to the rear side of the piston 1 by way of the port 69 and passages 60 and 58, driving the piston forwardly, while air exhausts from the front end of the cylinder through the passages 59 and 61 and port 70. As the rod 3 is carried forward by the piston, the carrier 20 accompanies it, responsive to the spring 35, until said carrier encounters the stop 36. (See Fig. 2.) The rod 3 continues its advance, sliding through the carrier, and thereby drives the dolly 6 between the jaws 17, ejecting the rivet 16, or other fastener, therefrom. The rivet, as it is so ejected, enters the intended drill or punch hole in the work, said hole having been disposed to receive the rivet by engaging the pin 12 therein. In completing its forward travel, the dolly upsets the forward end of the rivet against the seat-forming end of the bushing to head said end, the pin 12 being retracted by the rivet into the bushing.

The operator now releases the trigger, restoring the valve 63 to its normal position, thereby admitting air to the front end of the cylinder, and retracting the piston 1, dolly 6, jaws 17, and feed controller 33 to their normal positions.

It will be noted that during the forward stroke of the dolly, a rivet already occupying the jaws is advanced to riveting position and the controller 33 is forwardly shifted to allow another rivet to drop upon the top face of the dolly, being there retained by the guideway, as Fig. 2 illustrates. In completing the subsequent retractive stroke, the dolly is withdrawn from beneath such rivet and the jaws 17 closely follow the dolly so that the rivet is finally registered with the entrance slot 25 of the jaws and drops into the chamber 24 thereof.

During each retractive stroke of the piston, the air exhausting from the rear end of the cylinder 2 flows through the hose 72 to the rotary pneumatic motor, revolving the hopper 28 sufficiently to maintain a supply of rivets in the guideway.

When the described tool is to be used for driving nails, the anvil member 7 is replaced by one suited to the particular nature of the work, as has been described in connection with Fig. 11. The operation remains the same as for riveting, the stroke of the piston varying according to the thickness of the work.

When the tool is employed as a punch, as described in connection with Fig. 12, the operation still remains the same, the hopper, guideway, carrier 20, feed controller 33, and jaws 17 being, however, without function. In case it is required to use the tool solely as a punch for a considerable time period, a temporary removal of said non-functioning parts is advisable, and as shown in Fig. 12, said parts are omitted.

While the machine has been primarily described with reference to its use for riveting, it is is to be understood that minor modifications will readily adapt it to operation upon numerous other fasteners or other work pieces.

The invention is presented as including all such modifications and changes as come within the scope of the following claims.

What I claim is:

1. A pneumatic tool comprising a headed cylinder, a rod slidably extending through a head of said cylinder, a piston reciprocatory in the cylinder and having a drive connection to said rod, a pressure applicator carried by the rod exteriorly of the cylinder, and projecting beyond the rod, a pair of jaws for holding a headed fastener during its initial actuation by the applicator, a pair of supporting arms for said jaws yieldable to afford the jaws a separative travel as the applicator is advanced between the jaws, a carrier for said arms slidable on said rod to afford the applicator and said jaws a relative travel, and means carried by the rod, effective on the carrier, to move it in unison with the rod, during a predetermined portion of the rod travel.

2. In a pneumatic tool as set forth in claim 1, an anvil member spaced from the applicator along the extended axis of the applicator, a yoke rigidly projecting from said cylinder head and carrying said anvil member, and a pair of spaced guide rails carried by the yoke and coacting with said rod to guide said carrier in its sliding travel.

3. In a tool, a reciprocatory member, a pressure applicator carried and driven by said reciprocatory member, a carrier slidable relatively to the reciprocatory member in the direction of reciprocation, a pair of jaws for receiving a headed fastener and holding such fastener during initial travel of the pressure applicator, a pair of supporting arms mounted upon said carrier and carrying the jaws, and yieldable to afford the jaws a separative travel, a guideway for the delivery of fasteners to said jaws, and a controller for such delivery secured to said carrier.

4. A tool as set forth in claim 3, said controller being a U-shaped member through which the guideway extends, the closed end of the U-shaped member being movable into and out of the path of travel of the fasteners in the guideway, by sliding travel of the carrier.

5. In a pneumatic tool for applying work pieces, a hopper carrying a supply of the work pieces and having an outlet, an applicator, means for delivering work pieces from said outlet to the applicator, a compressed air motor driving the applicator, a second compressed air motor, means driven by the second motor for agitating the contents of the hopper to facilitate discharge thereof through said outlet, and means for delivering air exhausted from the first motor to drive the second motor.

6. In a pneumatic tool for applying work pieces, a hopper carrying a supply of the work pieces, and movable to agitate the work pieces, an applicator, means for delivering work pieces from the hopper to the applicator, a compressed air motor driving the applicator, a second compressed air motor, means for applying a periodic motion to the hopper from the second motor, and means for delivering air exhausted from the first motor to drive the second motor.

7. In a pneumatic tool for applying work pieces, a hopper carrying a supply of the work pieces, revoluble to induce a discharge of the work pieces, an applicator, means for delivering work pieces from the hopper to the applicator, a compressed air motor, a drive connection from such motor to the applicator, a second compressed air motor, means for revolubly driving the hopper from the second motor, and means for applying air exhausted from the first motor to drive the second motor.

8. In a pneumatic tool for applying work pieces, a hopper carrying a supply of the work pieces, and having an outlet, means for delivering work pieces from said outlet to the applicator, a cylinder, a piston reciprocatory in the cylinder, a drive connection from the piston to the applicator, a second compressed air motor, means driven by the second motor for agitating the contents of the hopper to facilitate discharge thereof from said outlet, means for delivering compressed air to the first motor, and means for delivering compressed air to the second motor under automatic control of the first control.

9. In a pneumatic tool for applying work pieces, a hopper carrying a supply of the work pieces, revoluble to induce a discharge of the work pieces, an applicator, means for delivering work pieces from the hopper to the applicator, a cylinder, a piston reciprocatory in the cylinder, a drive connection from the piston to the applicator, a second compressed air motor, means for revolubly driving the hopper from the second motor, means for delivering compressed air to the first motor, and means for delivering compressed air to the second motor under automatic control of the first motor.

10. A pneumatic tool comprising a headed cylinder, a piston reciprocatory in such cylinder, a yoke member projecting from a head of the cylinder, an anvil member carried by the yoke member and spaced from said cylinder head, guide means carried by the yoke member, a carrier slidably engaging the guide means, a stop carried by the yoke member limiting travel of the carrier, a rod actuable by the piston and slidable in the cylinder head, a spring coiled on such rod between the cylinder head and carrier and urging the latter toward the anvil member, an applicator carried by the rod and projecting therefrom toward the anvil member, a pair of jaws for holding a fastener in the path of the applicator, a pair of yieldable supporting arms for said jaws, mounted on said carrier, and a head fixed on said rod between the carrier and the anvil and serving to retract the carrier during the latter portion of the retractive stroke of the rod.

11. In a tool for applying headed fasteners, a reciprocatory member, a pressure applicator carried and driven by said reciprocatory member, a carrier slidable relatively to the reciprocatory member in the direction of reciprocation, a pair of jaws mounted on the carrier for receiving a headed fastener and holding such fastener during initial travel of the pressure applicator, means yieldably urging such jaws toward each other, a guideway for the delivery of fasteners to said jaws, and a controller for such delivery secured to the carrier.

12. A tool comprising a reciprocatory member, a pressure applicator carried and driven by the reciprocatory member, a carrier slidable relatively to the reciprocatory member in the direction of reciprocation, a guideway for delivering work pieces into the path of the applicator, and a controller for such delivery secured to said carrier.

13. In a tool as set forth in claim 12, means yieldably urging the carrier in the direction of pressure application, and a stop limiting response of the carrier to such means.

14. In a tool as set forth in claim 12, means yieldably urging the carrier in the direction of pressure application, and means carried by the reciprocatory member for retracting the carrier during a portion of the retractive stroke of the reciprocatory member.

15. A tool comprising a reciprocatory member, a pressure applicator carried and driven by the reciprocatory member, means for holding a work piece during its initial actuation by the applicator, a guideway for delivering work pieces to said holding means, a controller for such delivery, and a carrier for said holding means and controller slidable relative to the reciprocatory member in the direction of reciprocation.

16. In a tool as set forth in claim 15, means yieldably urging said carrier in the direction of pressure application, a stop limiting response of the carrier to such means, and means on the reciprocatory member for retracting the carrier during a portion of the retractive stroke of the reciprocatory member.

17. In a tool, a reciprocatory pressure applicator, a guideway for delivering work pieces into the path of said applicator, a substantially U-shaped control member for such delivery, the guideway being extended through such control member, and the control member being movable in the approximate direction of reciprocation of the applicator to shift the closed end of the control member into and out of the path of the work pieces in the guideway, and means for actuating the control member in timed relation to the reciprocatory member.

18. A tool comprising a reciprocatory member, a pressure applicator carried and driven by the reciprocatory member, a guideway for delivering work pieces into the path of the reciprocatory member, a controller for such delivery, a spring urging said controller out of the path of travel of the work pieces in the guideway, and means carried by the reciprocatory member and effective upon retraction of said member, to shift the controller into the last-mentioned path.

SILVER GELDHOF.